United States Patent [19]

Shubin

[11] Patent Number: 5,085,448
[45] Date of Patent: Feb. 4, 1992

[54] STACKABLE CONTAINERS

[76] Inventor: Don B. Shubin, 25 Bayberry, Irvine, Calif. 92715

[21] Appl. No.: 537,486

[22] Filed: Jun. 13, 1990

[51] Int. Cl.$^5$ .............................................. B60P 1/64
[52] U.S. Cl. .............................. 280/33.998; 206/509; 280/401; 298/8 R; 414/500
[58] Field of Search .............................. 206/509, 511; 280/33.991, 33.995, 33.998, 401; 414/500, 786; 298/8 R

[56] References Cited

U.S. PATENT DOCUMENTS

| | | | |
|---|---|---|---|
| 1,202,706 | 10/1916 | Grehan | 280/33.998 X |
| 2,610,750 | 9/1952 | Hulbert . | |
| 3,261,616 | 7/1966 | Mason | 280/33.99 |
| 3,606,059 | 9/1971 | Haberle, Jr. | 414/500 X |
| 3,628,805 | 12/1971 | Archer . | |
| 3,703,244 | 11/1972 | Walsh et al. | 414/500 |
| 3,842,982 | 10/1974 | Joyce | 206/509 X |
| 3,880,072 | 4/1975 | Ord | 414/500 X |
| 4,180,364 | 12/1979 | Fitzgerald-Smith et al. | 414/350 |
| 4,599,040 | 7/1986 | Rasmussen | 414/786 |
| 4,611,962 | 9/1986 | Braly et al. | 410/57 |
| 4,848,605 | 7/1989 | Wise | 206/511 X |

FOREIGN PATENT DOCUMENTS 3627040 2/1988 Fed. Rep. of Germany ........................ 280/33.998

Primary Examiner—Robert J. Spar
Assistant Examiner—Janice Krizek
Attorney, Agent, or Firm—Walter A. Hackler

[57] ABSTRACT

A stackable roll-off box comprises a generally rectangular bin having first and second opposing sides, first and second ends, and a bottom. Wheels are mounted to the bottom of the bin at the four corner regions thereof, the wheels being positioned for enabling the roll-off box to be rolled in a longitudinal direction. First and second rollers, which are smaller in diameter than the wheels, are mounted to bottom regions of the bin adjacent to one of its ends, each of the rollers being positioned outboard of a corresponding wheel and directly beneath an associated one of the bin sides. The rollers are mounted so that their peripheries are above the peripheries of the wheels. Plates are fixed to each side of the bin outboard of the rollers, the plates extending downwardly below lower regions of the rollers. An upwardly-opening roller-receiving recess is provided in upper regions of each of the bin sides above the rollers, the recesses being ramp shaped at one end. A roller stop is attached to the bin at the end of the recesses away from the ramps. Releasable locking levers are mounted adjacent each recess to keep rollers of an above stacked roll-off bin retained in the recesses. A kit, which includes two rollers, two plates, locking levers, and surfaces for the recesses, is provided for modifying existing, non-stackable roll-off boxes.

33 Claims, 3 Drawing Sheets

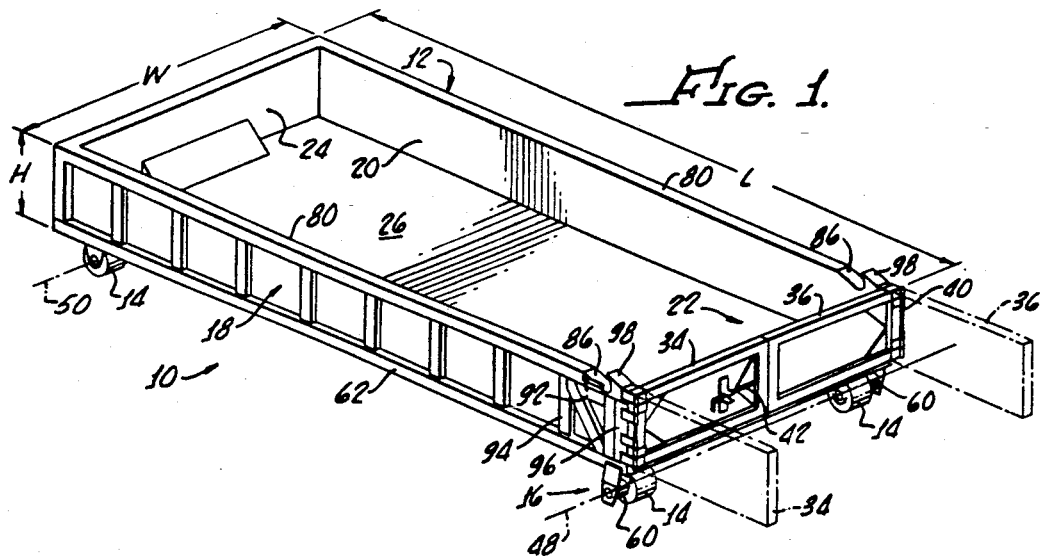
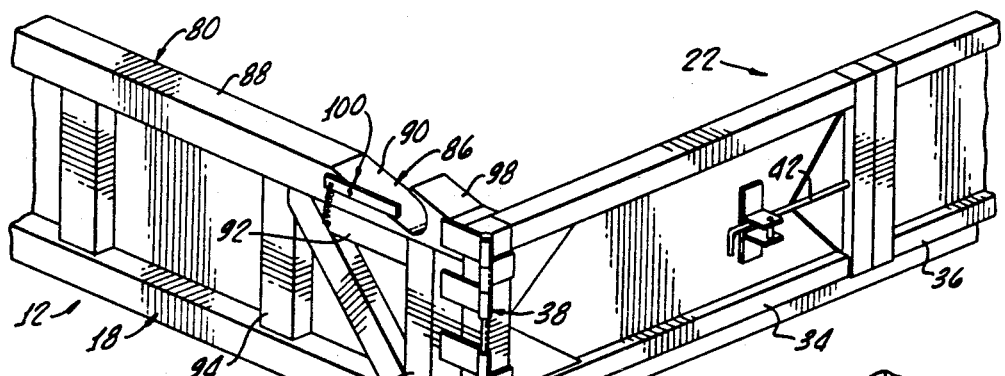
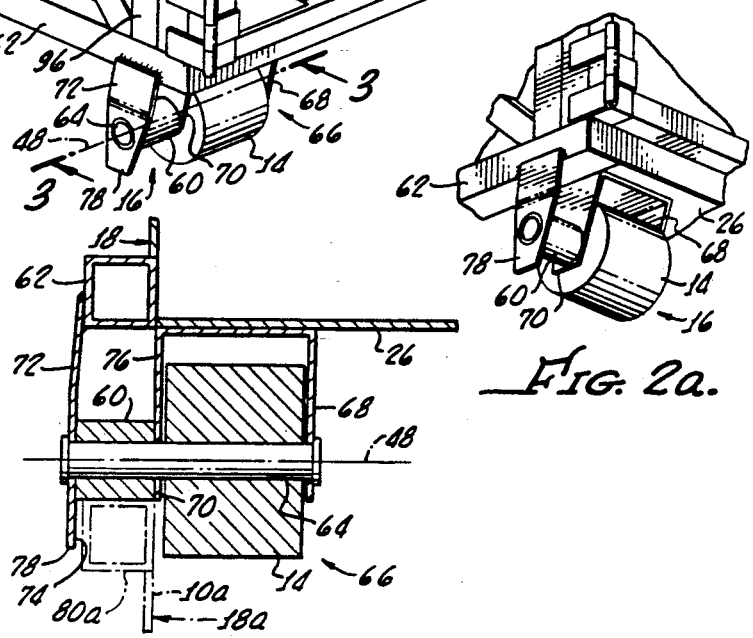
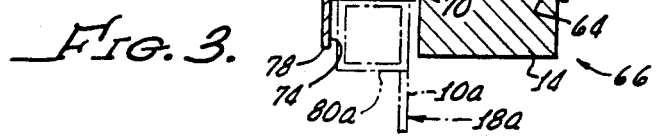

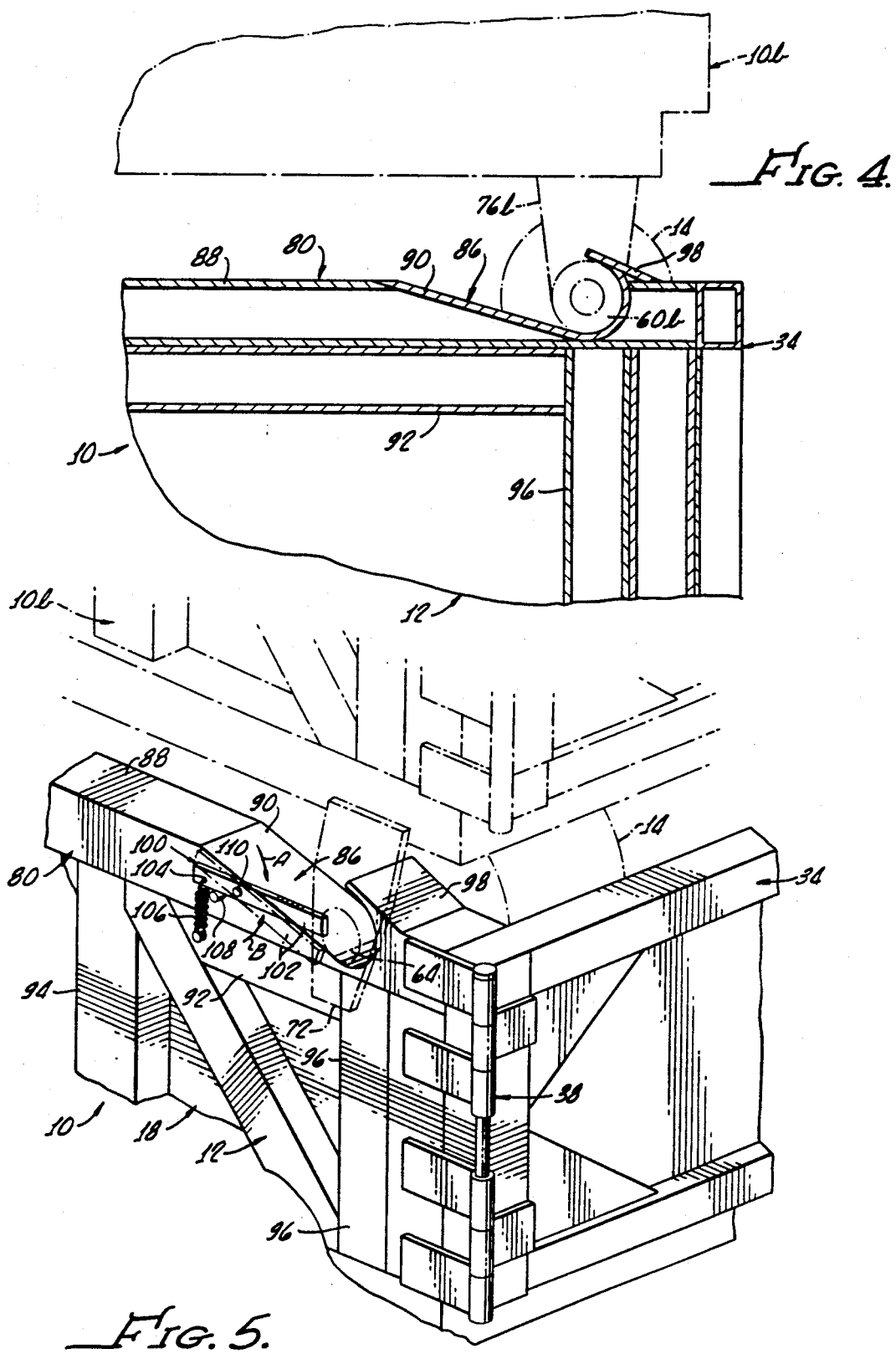

STACKABLE CONTAINERS

BACKGROUND OF THE INVENTION

1. Field of the Invention

The present invention relates generally to the field of industrial and commercial trash bins or containers and, more particularly, to large, wheeled industrial and commercial waste and trash bins or containers commonly known in the industry as "roll-off boxes".

2. Background Discussion

A number of types of large, wheeled commercial and industrial waste and trash bins or containers are in wide use, at least in the United States. One of these types is the ubiquitous "front-load container," which is typically about six feet wide, about four feet long and about five feet deep, and usually has a hinged cover or lid. This type of trash bin is ordinarily constructed having elongate, rectangular channels underneath, or on the sides, into which fit the projecting "tines" of fork lifts or fork lift-type apparatus on trash trucks. When trash is to be emptied from these containers, a trash truck, with its fork lift-type apparatus on the front of the truck, lifts the front load container up and over the top of the truck's cab and then pivots the container rearwardly so that it dumps its contents into a larger trash container on the truck. Such front load containers are most commonly used by stores, restaurants and other business establishments because, while large enough to hold a considerable amount of trash and waste, they are small enough to fit into alleys and the like. Another type of container is a type called "rent-a-bin" container which is commonly used for yard clean-up and is typically carried and delivered in a nested relationship with other similar containers.

Another major type of commercial and industrial waste and trash containers, and the type to which the present invention is particularly directed, is larger than a front load container, the bin or box of which is about eight feet wide and about sixteen feet long. For reasons which will become apparent, such containers or bins are typically referred to as "roll-off boxes." Such roll-off boxes usually have two standard depths: one depth is about three feet and the other depth is about six feet. Since both depths of roll-off boxes have about the same trash weight capacity, which is dependent upon the ability of an associated "roll-off truck" to pick up the loaded boxes and upon state and/or local restrictions, the depth of roll-off box selected depends upon the weight of trash or other materials to be dumped therein. For example, the three foot deep roll-off boxes are typically most efficiently used for heavy trash, such as as broken masonry, concrete and asphalt; earth; bricks and tile. The six foot deep roll-off boxes are typically constrained to receiving lighter-weight materials, such as scrap lumber, plasterboard, broken shingles, and tree branches and trimmings. As can be appreciated from the large capacity of roll-off boxes, they are most commonly used at construction and building demolition sites; although, the six foot deep roll-off boxes may be used for neighborhood clean-up projects in urban or suburban areas. To enable their easy emptying and also their filling, roll-off boxes are typically constructed with wide-swinging doors at one end, which may be considered the rear end of the boxes.

Roll off boxes are typically constructed having steel wheels several inches in diameter and several inches wide mounted at their lower corners so that the boxes can be rolled longitudinally along the ground and easily on-loaded and off-loaded onto associated roll-off trucks. Such trucks have a power-tiltable flat bed with a power winch at the front (cab) end thereof. When a roll-off box is to be on-loaded onto the roll-off truck, for example, so that, when empty, the box can be delivered to an intended use site or so that, when filled, it can be hauled to a dumping site, the roll-off truck backs up to the forward end of the box (that is, the end of the box without doors). The front end of the truck bed is then tilted upwardly until the rear end of the bed is near the ground or pavement. A cable from the power winch is attached to the forward end of the roll-off box to on-load onto the truck and the box is winched up onto the truck bed, the box rolling on its wheels. When the box is winched all the way onto the truck bed, the box is locked in place and the truck bed is tilted back to its normal, horizontal position. Empty roll-off boxes are off-loaded from the roll-off truck at a storage facility or at an intended use site by reversing the above-described on-loading procedure. To dump the contents of a loaded roll-off box (which is loaded on a roll-off truck) at a dumping site, such as a sanitary land fill, the rear doors of the container are opened and the bed of the roll-off truck is tilted so that the contents of the roll-off box slide out onto the ground, the combination roll-off box and roll-off truck functioning as a dump-truck.

A disadvantageous economic factor associated with the use of the shallower, three foot deep roll-off boxes is that such boxes, even though only about half the height of the six foot deep roll-off boxes, still have had to be delivered to use sites in the empty condition one at a time. Also when empty or lightly-loaded shallow roll-off boxes had to be otherwise moved around they have heretofore had to be moved one at a time. This one-at-a-time transporting of shallow roll-off boxes has been required even though the empty weight of such boxes is substantially less than the carrying capacity of the roll-off trucks, which are also used to transport the deeper roll-off boxes. Moreover, shallow roll-off boxes have heretofore required as much ground storage space as the deeper roll-off boxes, even though their volumetric capacity is only about half that of the deeper boxes.

It is, therefore, an objective of the present invention to enable shallow (that is, three foot deep) roll-off boxes to be stacked one upon another to a height of about three boxes without the use of any equipment other than a conventional roll-off truck, and to enable the simultaneous carrying of up to about three shallow roll-off boxes in a stacked condition on a single roll-off truck. It is a further objective of the present invention to provide a kit for enabling the modifying of existing shallow roll-off boxes so that they can be easily stacked one upon another by the use of only a conventional roll-off truck.

SUMMARY OF THE INVENTION

In accordance with the present invention there is provided a stackable roll-off box which comprises a generally rectangular bin having first and second ends, first and second opposing sides, and a bottom. Preferably the first end of the bin is hinged or comprises hinged doors to enable unloading when the bin is loaded with trash or the like. Main wheels are mounted to the bottom of the bin at the four corner regions thereof, the main wheels being in planes parallel to a longitudinal axis of the bin so as to enable the bin to be rolled along a surface. Stacking means are mounted to bottom regions of the bin for enabling the bin to be moved longitudinally along upper edge regions of the first and second sides of a similar underneath stackable roll-off box so that the roll-off box can be stacked on top of the underneath roll-off box with the longitudinal axes of the two roll-off boxes in a common, substantially vertical plane.

In accordance with a preferred embodiment of the invention, the stacking means comprise first and second rollers or secondary wheels which are mounted to bottom regions of the bin at opposite corner regions of the first end thereof, the first and second rollers being mounted outboard of corresponding ones of the main wheels and being laterally spaced apart a distance enabling the rollers to roll along the upper edges of respective first and second sides of the underneath roll-off box on which the roll-off box is being stacked.

It is preferred that the first and second rollers each have the same outer diameter and are mounted on a common lateral rotational axis, the rollers being in planes parallel to those of the adjacent main wheels. Preferably the outer diameters of the first and second rollers are the same and are substantially smaller than the outer diameters of the adjacent wheels, the rollers being mounted so that their lower regions are substantially above a surface on which the adjacent wheels are resting. Still more preferably, the wheels adjacent to the first and second rollers are on a common, lateral rotational axis and that the rotational axis of the first and second rollers is coincident with rotational axis of the adjacent wheels.

Further in accordance with a preferred embodiment of the invention, each of the first and second rollers is mounted to the bin with a generally vertical plate which extends downwardly along the outside of the roller to substantially below the roller, the two plates being positioned a lateral distance apart for keeping the first and second rollers from slipping sidewardly off the upper edges of corresponding first and second sides of the underneath roll-off box on which the roll-off box is being stacked.

Regions of upper edges of the first and second sides of the bin adjacent the first end of the bin, and substantially above corresponding ones of the first and second rollers, are recessed downwardly to receive the corresponding first and second rollers of a similar, upper roll-off box being stacked on top of the roll-off box when the corresponding first end of the upper roll-off box is adjacent to the first end of the roll-off box. Regions of the upper edges of the first and second sides of the bin are ramped upwardly and away from the first end of the bin so that as the upper roll-off box is rolled onto the roll-off box the rollers of the upper roll-off box roll down into the corresponding recesses instead of dropping thereinto and so that the rollers of the upper roll-off box can ramp up out of their corresponding recess when the upper roll-off box is pulled off of the roll-off box for unstacking of the two roll-off boxes.

Stops are preferably provided at the ends of the roller-receiving recesses toward the first end of the bin so as to stop an upper roll-off box being stacked on top of the roll-off box when the rollers of the upper roll-off box roll into the recesses of the roll-off box. It is further preferred that releasable locking means be provided on the bin to prevent the unstacking of an upper roll-off box stacked on top of the roll-off box. Such releasable locking means may advantageously comprise a latch pivotally mounted to at least one of the first and second sides of the bin adjacent the associated roller-receiving recess, the latch being pivotable between a first, locked position wherein a roller of an upper roll-off box received into the recess is prevented from ramping upwardly out therefrom and a second, unlocked position in which the roller is free to ramp up out of the recess, and including a pin to releasably retain the latch in the locked position. Preferably a spring is provided for urging the latch, when it is unpinned, toward the first, locked position.

The present invention includes the modification of non-stackable roll-off boxes having bins similar to that of the stackable roll-off bin. Such preexisting roll-off bins are modified by the mounting of the first and second rollers to the preexisting bin outboard of the preexisting wheels at one end of the bin, preferably at the end of the bin having doors, and forming a recess in each of the upper edges of the first and second sides of the preexisting bin at the end of the bin above the added rollers. Outside plates are provided for each of the rollers to keep the rollers from slipping sidewardly off of another stackable roll-off box on which the modified roll-off box is being stacked. Stops are provided at one end of the recesses and the other end of the recesses are ramped. A locking latch is provided at at least one of the recesses to releasably lock a roller of a stackable, upper roll-off box which is stacked on top of the modified roll-off box. A corresponding kit of parts and instructions is provided for modifying non-stackable roll-off boxes to enable their stacking and a corresponding method for modifying non-stackable roll-off boxes into stackable roll-off boxes is within the scope of the invention.

The present invention also covers a corresponding method of stacking stackable roll-off boxes, the method comprising the step of rolling a stackable roll-off bin held on the tiltable bed of an associated roll-off truck onto one of the stackable roll-off bins on the ground and then on-loading the two stacked roll-off bins onto the roll-off truck. The method may further comprise rolling the two stacked stackable roll-off boxes off the roll-off truck onto a third stackable roll-off box standing on the ground and then on-loading all three stacked roll-off boxes onto the roll-off truck. The method further comprises the corresponding steps of delivering two or more stacked roll-off boxes, one at a time, to one or more delivery sites.

By means of the present invention, two or more roll-off bins can advantageously be stacked one upon another for such purposes as delivering empty roll-off boxes to use sites to thereby save on delivery time and costs or to conserve space at roll-off bin storage facilities. No special equipment is required for the stacking and the unstacking of stackable roll-off boxes, only conventional roll-off trucks being needed. In addition, each stacked roll-off bin may be separately and independently emptied at a site in situations where separation of contained trash or materials is desired.

Preexisting, non-stackable roll-off boxes can be economically modified into stackable roll-off boxes with the use of kits.

BRIEF DESCRIPTION OF THE DRAWINGS

The present invention can be more readily understood by a consideration of the following detailed description when taken in conjunction with the accompanying drawings, in which:

FIG. 1 is a perspective of a stackeble roll-off box in accordance with the present invention, showing general features thereof;

FIG. 2 is a partial perspective drawing of a left, rear corner region of the roll-off box of FIG. 1, showing the installation of a roller or secondary wheel under such corner by means of which, along with a similar roller or secondary wheel on the opposite corner of the box, the roll-off box can be rolled rearwardly along an upper side rail of another stackable roll-off box, and showing a roller-receiving recess formed into the upper edge of the left side top rear corner into which the roller or secondary wheel of another stackable roll-off box being stacked on top of the present roll-off box is received when the two roll-off boxes are properly stacked together, and further showing a stop and a releasable locking lever or bar for preventing the upper one of the two stacked roll-off boxes from rolling off from the lower one of the two roll-off boxes;

FIG. 2a is a perspective view showing the mounting of the roller below a longitudinal beam at the bottom of a side of the bin.

FIG. 3 is a transverse cross sectional drawing, taken along line 3—3 of FIG. 2, showing the relationship of one of the rollers or secondary wheels to the corresponding one of the main wheels of the roll-off box and showing the manner in which the roller or secondary wheel is constrained to the upper edge of the corresponding side of a similar roll-off box onto which the present roll-off box is stacked;

FIG. 4 is a partially cut away side view of left, rear corner regions of upper and lower stackable roll-off boxes stacked together, showing the manner in which one of the rollers or secondary wheels of the upper roll-off box is received into a coresponding one of the roller-receiving recesses in the upper edge of the corresponding side of the lower one of the roll-off boxes;

FIG. 5 is a partial perspective drawing of the upper left, rear corner of the lower one of two stacked roll-off boxes and the lower left rear corner of the upper one of the two stacked roll-off boxes and also showing one of the rollers or secondary wheels of the upper roll-off box received into the corresponding roller-receiving recess of the lower roll-off box and further showing the locking of the roller in the roller-receiving recess;

FIG. 6B showing the tilting bed of the roll-off truck tilted so that the forward end of the bed is higher than the rear end thereof and showing the roll-off box on the truck being caused, by the elevating of the truck bed, to roll rearwardly onto the top of the roll-off box on the ground; and FIG. 6C showing the two roll-off boxes stacked on top of one another on the ground and showing the tilting bed of the truck tilted so that the rear end thereof is near ground level in a position enabling the two stacked roll-off boxes to be then on-loaded onto the roll-off truck as a single unit.

In the various FIGS. like elements and features are given the same reference number and/or other identification.

DESCRIPTION OF THE PREFERRED EMBODIMENT

Figure 6A:
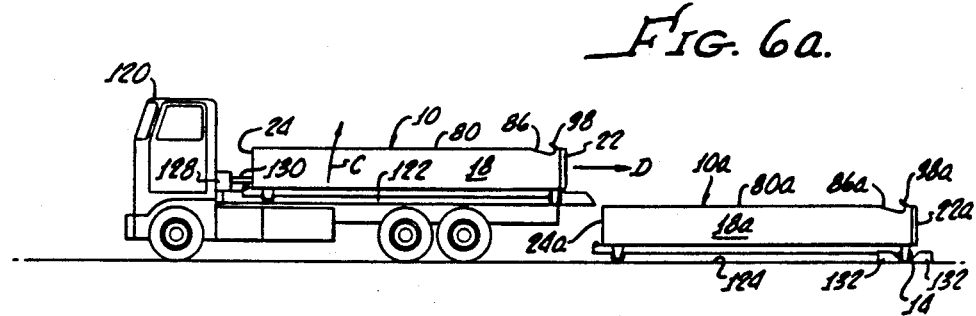
FIGS. 6A-6C depict a sequence of pictorial drawings showing the manner in which one stackable roll-off box is stacked on top of another stackable roll-off box using a conventional roll-off truck, FIG. 6A showing one stackable roll-off box on the ground and a roll-off truck with another stackable roll-off box loaded onto the truck bed, the truck having been backed into a position so that the two roll-off boxes are longitudinally aligned with the rear end of the roll-off box on the truck somewhat forwardly of the forward end of the roll-off box on the ground, and with the rear end of the roll-off truck tilting bed adjacent the forward end of the roll-off box on the ground.

There is depicted in FIG. 1 a stackable roll-off box or bin 10. Shown generally comprising roll-off box 10 are a bin or bin portion 12, four main wheels 14 (only three of which are shown), and stacking means 16 (more particularly described below) for enabling one stackable roll-off box to be rolled along the top side edges of another stackable roll-off box for stacking purposes.

Bin 12 comprises respective first and second, opposing, vertical sides 18 and 20, respective first and second ends 22 and 24 and bottom 26. As depicted in FIG. 1, first end 22 may be considered to be the rear or rearward end of bin 12 and second end 24 may be considered to be the front or forward end of the bin. Sides 18 and 20 of bin 12 each have a side length, L, which may, for example, be equal to about 16 feet and have a height, H, which may, for example, be equal to about 3 feet. Height, H, of bin sides 18 and 20, of course, determines the depth of bin 12. First and second ends 22 and 24 of bin 12 each have a width, W, which may, for example, be equal to about 8 feet. Dimensions L, H, and W of bin 12 are preferably about the same as those of the bins of conventional, non-stackable roll-off bins.

First, rear end 22 of bin 12 may, as depicted, be formed of respective first and second doors 34 and 36. First door 34 is hinged along one vertical edge to the rear, vertical edge of first bin side 18 by first hinging means 38. In a similar manner, second door 36 is hinged along one vertical edge to the rear vertical edge of second bin side 20 by second hinging means 40. Door locking means 42 are provided on doors 34 and 36 to keep the doors closed; when unlocked, the doors are free to swing open. As depicted in phantom lines in FIG. 1 doors 34 and 36 are opened through 90 degrees; although, the doors may be swung open through as much as 270 degrees so as to to lie flat along side of corresponding bin sides 18 and 20 and be out of the way for bin loading operations.

Main wheels 14, which may be 6 to 8 inches in diameter and about 8 to 10 inches wide, are mounted to bin bottom 26 at the four corner regions of bin 12. The two rear wheels 14 are mounted on a common rotational axis 48 which is parallel to and adjacent bin first end 22. Similarly, the two front wheels 14 are mounted on a common rotational axis 50 which is parallel to and adjacent to second bin end 24. Such arrangement of wheels 14 permits roll-off box 10 to be rolled longitudinally along a surface and to be on-loaded and off-loaded from an associated roll-off truck (not shown in FIG. 1). The locating of wheels 14 at bin ends 22 and 24 permits roll-off box 10 to be rolled onto and off a relatively steeply inclined tilting bed of the roll-off truck from and onto a horizontal surface. Preferably the rear and front wheels are in longitudinal alignment with one another.

Bin sides 18 and 20, ends 22 and 24 and bottom 26 are constructed of heavy gauge sheet steel, and are assembled and reinforced and/or stiffened in the same manner as conventional roll-off boxes of comparable size and holding capacity. Consequently, no further description of bin 12, other than that needed to describe the present invention, is considered necessary.

FIG. 2 illustrates principal features of the present invention. Stacking means 16 comprise a pair of laterally spaced apart rollers or secondary wheels 60, only one of which is shown in FIG. 2 (although, both are shown in FIG. 1) which are mounted to bin bottom 26 at one end of bin 12. As shown in the FIGS. 1, 2, 4 and 5, rollers 60 are mounted closely adjacent to bin first end 22. Each of rollers 60 is mounted outboard of a corresponding one of wheels 14 so that one of the rollers is located directly below a longitudinal beam 62 at the bottom of bin first side 18 (FIGS. 2 and 3) and so that the other roller is directly below a corresponding longitudinal beam at the bottom of bin second side 20.

Preferably, as shown in FIGS. 1-3, rollers 60 are mounted on a transverse or lateral rotational axis which is coincident with rotational axis 48 of the rearward pair of wheels. In such case, the roller 60 which is located below bin first side 18 is preferably mounted on the same axle 64 as the corresponding one of main wheels 14. As shown for the wheel 16 depicted in FIGS. 2 and 3 (that is, the wheel which is mounted at the rear left corner of bin 12, for the orientation of the bin in FIG. 1), axle 64 is mounted to bin bottom 26 by an inverted U-shaped bracket 66 having downwardly-extending respective inboard and outboard wheel-mounting legs 68 and 70 through which axle 64 extends. Bracket 66 may be welded or bolted to bin bottom 26 and is made of heavy gauge steel.

Axle 64 is additionally mounted at its outer end through a rigid plate 72 which is attached to bin first side 18 so as to depend therefrom. Axle 64 is fastened to bracket legs 66 and 68 and plate 72 in any suitable manner, such as tack welding, known to those skilled in the art.

Associated roller 60 is mounted on axle 64 between plate 72 and outboard leg 70 of wheel mounting bracket 66, the width of the roller being slightly less than the separation between inside surface 74 of the plate and outside surface 76 of the outboard leg (FIG. 3). Plate 72 is constructed so that a lower edge 78 thereof (FIGS. 2 and 3) extends downwardly substantially beyond the bottom of associated roller 60. As such, plate 72 also functions as a side stop or guide to keep roller 60 from slipping sidewardly off a top longidudinal beam 80a which defines the upper edge of a corresponding side 18a of another, similar stackable roll-off box 10a on which roll-off box 10 is stacked (relevant portions of underneath roll-off box 10a are shown in phantom lines in FIG. 3).

The other one of rollers 60 is mounted at the right rear corner of bin 12 in the same manner as described above for the left rear corner one of rollers 60.

As best shown in FIG. 2 for the left upper rear of roll-off box 10, a roller receiving recess or cutout 86 is formed downwardly, from an upper surface 88, into top longitudinal beam 80 of bin first side 18 forwardly adjacent to bin first (rearward) end 22. A forward region 90 of recess 86 is ramped downwardly from top beam upper surface 88. Ramped region 90 enables a corresponding roller 60b of a similar roll-off box 10b (shown in phantom lines in FIG. 4) to roll down into recess 86, instead of abruptly dropping thereinto, when above roll-off box 10b is rolled onto the top of roll-off box 10 to stack the two boxes together and so that roller 60b can ramp up out of recess 86 when the upper roll-off box is rolled off the top of roll-off box 10 to unstack the two boxes. Recesses 60 may be sized in order that when roll-off box 10 is stacked on an identical roll-off box, longitudinal beam 80 of one box engages longitudinal box 62 of the other box with no load on the rollers. Note that when the two roll-off boxes are properly stacked upon one another forward wheels 14 of the upperbox are received into bin 12 of the lower box forwardly adjacent of forward end 24 thereof.

A short longitudinal beam 92 (FIGS. 1, 2, 4 and 5) is attached to first bin side 18 beneath recess 86 and between vertical beams 94 and 96 to strengthen the region of upper beam 80 weakened by the forming of the recess.

A forwardly and upwardly extending stop 98 is fixed to first bin side 18 at and above the rearward end of recess 86 (FIGS. 1, 2, 4 and 5). Stop 98 is configured to prevent roller 60b of above-stacked roll-off box 10b (FIG. 4) from rolling upwardly and rearwardly out of its corresponding recess 86 when the above roll-off box is rolled onto the top of roll-off box 10 for the stacking of box 10b onto box 10, thereby stopping the above roll-off box from overshooting roll-off box 10.

A similar recess 86 and stop 98 are provided at the upper, rearward region of second bin side 20 (FIG. 1).

Releasable locking means 100 (FIGS. 2 and 5) are provided for preventing a stacked upper roll-off box 10b (FIG. 5) from unintentionally rolling back off from the top of roll-off box 10. As illustrated, locking means 100 comprises an elongate lever or arm 102 which is pivotally mounted by a pin or bolt 104 to top beam 80 of first bin side 18, just forwardly of recess 86. Pivot pin 104 enables lever 102 to pivot between the upward, locked position shown in solid lines in FIG. 5 and a lower, unlocked position. A spring 106 is used to urge lever 102 toward the locked position, a stop 108 being mounted on upper beam 80 in the path of lever 102 to stop the lever from being pivoted by spring 106 beyond the locking position. A removable pin 110 is provided for retaining lever 102 in the locking position.

When lever 102 is in the locking position (FIG. 5), rearward end regions of the lever extend rearwardly along the outside of upper beam 80 and along the side of ramp region 90 of recess 86 in a manner blocking associated roller 60b from ramping forwardly and upwardly out of the recess. However, with pin 110 removed for enabling the stacking of an upper roll-off box 10b onto roll-off box 10, lever 102 is caused by associated roller 60b to pivot downwardly (direction of Arrow "A", FIG. 5) against the the action of spring 106 as the roller rolls rearwardly on upper beam 80 onto and down recess ramp region 90. Lever 102 is configured so that when roller 60b is fully into recess 86, the lever automatically pivots back upwardly (direction of Arrow "B"), under the force of spring 106, to its locking position. Pin 110 is then normally installed to keep lever 102 in its locking position.

To enable the unstacking of upper roll-off box 10b from roll-off box 10, pin 110 is removed and lever 102 is manually pivoted downwardly to its unlocked position. In such unlocked position, pin 110 is installed in another aperture (not shown) keeping lever 102 in its unlocked position while upper roll-off box 10b is pulled forwardly off from the top of roll-off box 10.

Releasable locking means 100 may be installed on only one side of bin 12; although, it is preferred that locking means 100 be installed on both sides of the bin to assure safe and secure positioning of upper roll-off box 10b on top of roll-off box 10.

It will be appreciated that stops 98 and locking levers 102 (when in their locking position) combine to prevent either rearward or forward movement of the above roll-off box 10b relative to roll-off box 10 on which the upper box is stacked, thereby keeping the two roll-off boxes securely stacked together. This secure stacking together is especially important when two or three stacked roll-off boxes 10 are being on-loaded onto or off-loaded from the associated roll-off truck.

It is to be appreciated that although the foregoing has described the complete construction of roll-off box 10, preexisting similar, but non-stackable roll-off boxes can readily be modified to provide the described stacking capabilities. The factory modification of such preexisting, non-stackable roll-off boxes in a manner obvious from the foregoing procedure for making roll-off box 10 is within the scope of the present invention, as is the supplying of "do-it-yourself" kits to enable owners of non-stackable roll-off boxes to convert the boxes for stacking. Such kits would, for example, include axles 64, rollers 60, plates 72, stops 98, reinforcing beams 92, plates in the shape of ramping region 90 and recess 86, locking means 100, and instructions for making the modifications.

STACKING AND UNSTACKING OF ROLL-OFF BOXES 10

Figure 6B:
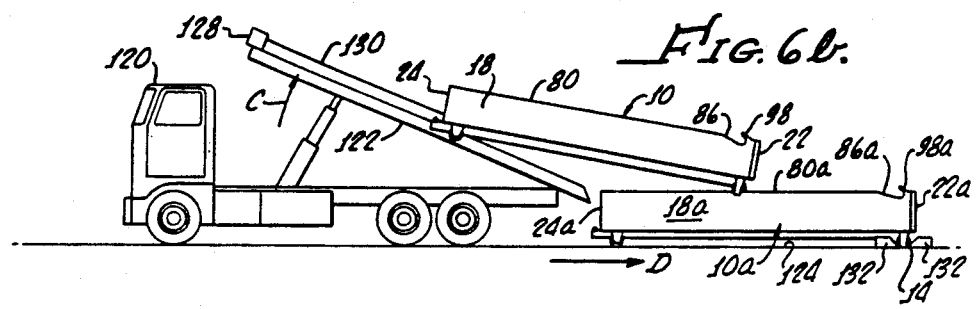
Figure 6C:
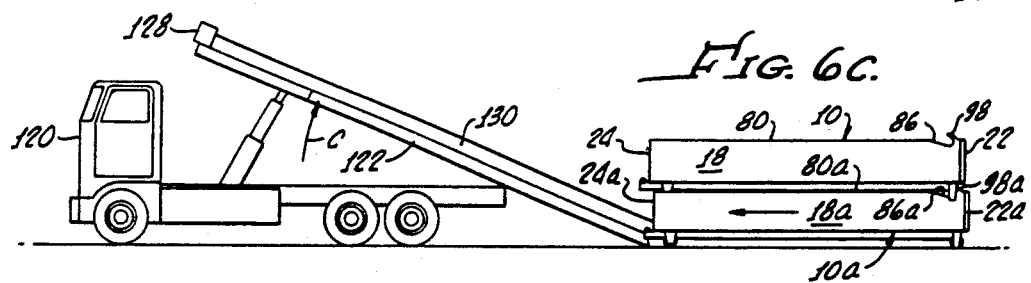
Figure 7:
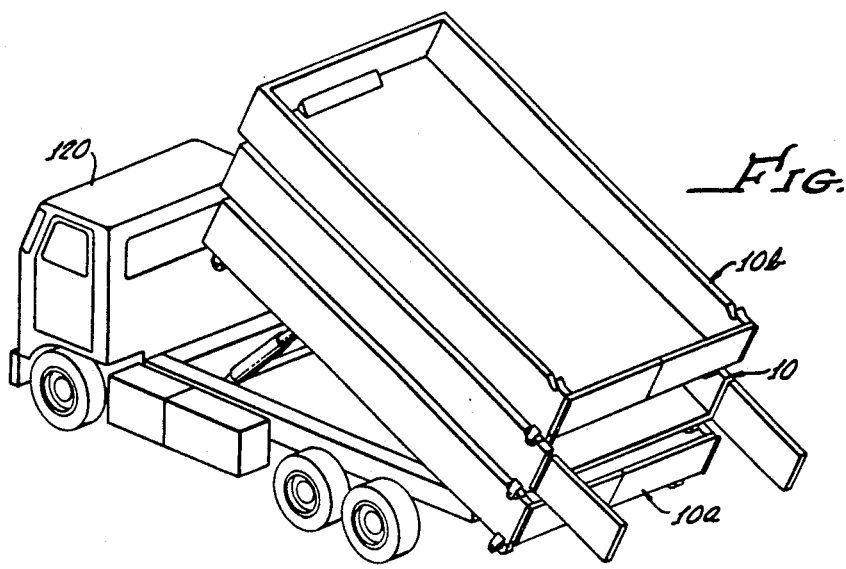
FIG. 7 is a perspective view of a truck selectively dumping one of several roll-off boxes stacked thereon.

A method of stacking two (or more) stackable roll-off boxes 10 is depicted in FIGS. 6A-6C. FIG. 6A depicts a roll-off truck 120 having a tiltable flat bed 122 on which is carried, in a conventional manner of transporting roll-off boxes, a roll-off box 10 which is to be stacked on top of a similar, stackable roll-off box 10 on the ground. Truck 120 is backed up toward the forward end of roll-off box 10a which is resting at ground level on a paved or other surface 124 until box 10 on the truck is aligned with box 10a on the ground and the rearward end 22 of box 10 is just forward of forward end 24a of box 10a. Because of the height of truck bed 122 and the depth of roll-off boxes 10a, box 10 on the truck bed will be somewhat higher than box 10a on the ground.

With roll-off box 10 aligned with roll-off box 10a, an operator of roll-off truck 120 begins tilting truck bed 122 so that the front end of the bed is elevated upwardly (direction of Arrow "C"). At the same time, the operator starts playing out a cable 130 which is attached from winch 128 to front end 24 of roll-off box 10 carried on truck bed 122. As a result, roll-off box 10 is enabled to start rolling rearwardly off truck bed 122. After box 10 rolls a short distance in this manner, its rollers 60 (not shown) start engaging top beams 80a of sides 18a and 20a (side 20a not being shown) of roll-off box 10a on the ground. Roll-off box 10 then starts rolling off truck bed 122 and onto roll-off box 10a. Wheel chocks 132 may be used to block wheels 14a of roll-off box 10a to prevent its rolling while roll-off box 10 is rolled on to it.

As the front of truck bed 122 is continued to be elevated (FIG. 6B) and cable 130 is continued to be played out from winch 128, roll-off box 10 continues to roll, on its rollers 60 (in the direction of Arrow "D") along side upper beams 80a of roll-off box 10a toward its rear end 22a. The off-loading of roll-off box 10 from truck bed 122 onto roll-off box 10a continues until rollers 60 on roll-off box 10 reach and ramp downwardly into recesses 86 at the rearward end of top beams 80a of box 10a. Stops 98a on box 10a prevent further movement of box 10 onto box 10a, and at this point roll-off box 10 is fully rolled onto and is stacked on top of roll-off box 10a, with the forward pair of wheels 14 of the upper box inside of bin 12a of lower box 10a. Locking levers 102 (not shown) on lower roll-off box 10a will normally be in, and be retained in, their locking position to prevent upper roll-off box 10 from rolling forwardly off from roll-off box 10a.

The two stacked roll-off boxes 10 and 10a may now be loaded together onto roll-off truck 120. To do so, truck bed 122 is pivoted further until its rear end is near ground level in front of roll-off box 10a (FIG. 6c). Cable 130 from winch 128 is then attached to front end 24a of roll-off box 10a (the bottom box) and both boxes 10 and 10a are winched up truck bed 122 until they are all the way onto the truck bed, which is then lowered to its horizontal position.

If the stacked roll-off boxes 10 and 10a are to be stacked upon a third roll-off box on the ground, the above procedure is repeated.

When a stack of roll-off boxes 10, 10a, etc. are to be off-loaded from roll-off truck 120 in a manner delivering the boxes one at a time to use locations, the entire stack of roll-off boxes are off-loaded in the same manner that a single roll-off box would be off-loaded. Then, with the rear end of truck bed 122 at the level of the next-to-the-bottom roll-off box and with locking levers 102 of the bottom roll-off box retained in their unlocked position, truck winch 128 is used to winch all of those roll-off boxes which are stacked on top of the bottom roll-off box forwardly off the bottom box and up onto truck bed 122, which is then lowered to its horizontal position. In this manner, only the bottom roll-off box is left on the ground. This procedure is repeated until all of the roll-off boxes originally stacked on truck bed 122 are off-loaded onto the ground at individual locations.

Although roll-off boxes 10 are, because of weight considerations, usually stacked only when empty, lightly-loaded roll-off boxes may also be stacked in the above-described manner and the contents of both may be dumped at the same time in the manner of dumping only a single roll-off box. Alternatively, since doors 34 and 36 of the roll-off boxes are individually operable, the contents of each roll-off box can be separately and independently dumped.

Normally, for the sake of safety, only three roll-off boxes 10 will be stacked on top of one another, unless the height of each of the boxes is substantially less than about three feet. Usually the stacking of roll-off boxes having a height much greater than three feet is impractical since the tops of such boxes when the boxes are on the ground would be higher than the height of truck bed 122. Provisions could however be made to stack such higher roll-off boxes if the roll-off truck is either elevated or the boxes are in depressions on the ground.

Although there is described above a specific arrangement of a stackable roll-off box, a kit to modify existing roll-off boxes for stacking, and a stacking procedure, all in accordance with the present invention for the purpose of illustrating the manner in which the invention can be used to advantage, it is to be appreciated that the invention is not limited thereto. Accordingly, any and all variations and modifications which may occur to those skilled in the art are to be considered to be within the scope and spirit of the invention as defined by the appended claims.

What is claimed is:

1. A stackable roll-off box which comprises:
   a. a generally rectangular bin having first and second opposing sides, first and second ends, and a bottom;
   b. wheels mounted to the bottom of said bin at the four corner regions thereof, said wheels being positioned for enabling the roll-off box to be rolled in a longitudinal direction along a surface; and c. stacking means mounted to bottom regions of the bin for enabling the roll-off box to be moved longitudinally along the top of a second, similar underneath roll-off box so that said roll-off box can be stacked on top of said second underneath roll-off box with the longitudinal axes of both of said roll-off boxes in a common longitudinal plane which is at least substantially vertical, said stacking means comprise first and second rollers mounted to bottom regions of the bin adjacent to one of said first and second ends, each of said first and second rollers being positioned outboard of associated ones of said wheels, said first and second rollers being spaced a distance apart enabling the rollers to roll along upper regions of corresponding opposite sides of said second, underneath roll-off box.

2. The stackable roll-off box as claimed in claim 1, wherein said first and second rollers each have the same outer diameter and are mounted on a common transverse rotational axis.

3. The stackable roll-off box as claimed in claim 2, wherein said first and second rollers are substantially smaller in diameter than the associated wheels of which they are outboard and wherein the first and second rollers are mounted so that their peripheries are substantially above a surface on which said associated wheels rest.

4. The stackable roll-off box as claimed in claim 2, wherein said associated wheels are mounted adjacent to said one end of the bin on a common transverse rotational axis, and wherein the common transverse rotational axis of the rollers is concident with the common transverse rotational axis of said associated wheels.

5. The stackable roll-off box as claimed in claim 1, wherein each of said first and second rollers is mounted to said bin with a generally vertical plate which extends downwardly along the outside of the associated wheel substantially beyond said roller, said plates being positioned laterally a distance apart for keeping said rollers from slipping sidewardly off the tops of opposite sides of said second, underneath roll-off box on which the roll-off box is being stacked.

6. The stackable roll-off box as claimed in claim 1, wherein the tops of said first and second sides adjacent to one end of the bin have formed there recesses to receive the rollers of an upper roll-off box being stacked upon the roll-off box when the upper roll-off box is fully rolled thereonto.

7. The stackable roll-off box as claimed in claim 6, wherein a region of the top of an associated side of the bin is ramped downwardly into said recesses so that the rollers of said upper roll-off box are enabled to ramp upwardly and out of said recesses when said upper roll-off box is being rolled off of said roll-off box in the opposite direction to that in which said upper roll-off box is rolled onto said roll-off box.

8. The stackable roll-off box as claimed in claim 7, wherein a stop is provided at the end of each of said recesses opposite to the side of said downwardly ramped regions for stopping continued movement of the rollers of said upper roll-off box when said upper roll-off box is being rolled onto the top of said roll-off box and said rollers of the upper roll-off box have ramped downwardly into said recesses.

9. The stackable roll-off box as claimed in claim 7, including releasable locking means for preventing the rollers of said upper roll-off box from ramping back up said ramping regions of the recesses.

10. The stackable roll-off box as claimed in claim 9, wherein said releasable locking means comprise a latch pivotally mounted to at least one of said first and second sides of the bin.

11. The stackable roll-off bin as claimed in claim 10, wherein said releasable locking means include a locking lever pivotally mounted to said at least one of said first and second sides of the bin, said lever being movable between a locking position and an unlocking position, and including means for urging said lever toward said locking position when said lever is moved therefrom toward said unlocking position, and further including means for retaining said lever in both of its locking and unlocking positions.

12. The stackable roll-off bin as claimed in claim 11, wherein said locking lever is positioned so that an associated roller on said upper roll-off box ramping downwardly into an associated recess causes the lever to be pivoted out of said locking position so as to enable said associated roller of the upper roll-off box to enter the recess, said urging means thereafter causing the lever to return to its locking position.

13. A stackable roll-box which comprises:

a. a generally rectangular bin having first and second opposing sides, first and second ends, and a bottom;

b. wheels mounted to the bottom of said bin at the four corner regions thereof, said wheels being positioned for enabling the roll-off box to be rolled in a longitudinal direction along a surface; and c. first and second rollers mounted to bottom regions of the bin adjacent to one of said first and second ends, each of said first and second rollers being positioned outboard of an associated one of said wheels, said first and second rollers being mounted directly beneath an associated one of said first and second sides, and said first and second rollers each having the same outer diameter and being mounted on a common transverse rotational axis.

14. The stackable roll-off box as claimed in claim 13, wherein said first and second rollers are substantially smaller in diameter than the associated wheels of which they are outboard and wherein the first and second rollers are mounted so that their peripheries are substantially above a surface on which said associated wheels rest.

15. The stackable roll-off box as claimed in claim 13, wherein said associated wheels are mounted adjacent to said one of said first and second ends of the bin on a common transverse rotational axis, and wherein the common transverse rotational axes of the rollers and the associated wheels are coincident.

16. The stackable roll-off box as claimed in claim 13, including a first plate fixed to the bin outwardly adjacent to the first roller and a second plate fixed to the bin outwardly adjacent to the second roller, each of said plates extending downwardly below the peripheries of its associated roller, said plates being positioned laterally a distance apart which is slightly greater than the width of said bin.

17. The stackable roll-off box as claimed in claim 16, wherein the first and second plates are fixed to corresponding ones of said first and second sides of the bin.

18. The stackable roll-off box as claimed in claim 13, wherein regions of the tops of said first and second sides substantially above the first and second rollers are recessed downwardly by an amount equal to or less than the diameter of said rollers so as to form a roller-receiving recess for limiting the longitudinal movement of an above-stacked roll-off box.

19. The stackable roll-off box as claimed in claim 18, wherein regions of said recesses away from said one of said first and second ends are ramped downwardly from the top of the associated side of the bin into said recesses.

20. The stackable roll-off box as claimed in claim 18, wherein a stop is provided at the end of each of said recesses adjacent to said one of said first and second ends so as to prevent the rollers of an above stacked roll-off box from rolling out of said recesses toward said one of said first and second ends of the bin.

21. The stackable roll-off box as claimed in claim 18, including releasable locking means for blocking rollers of an above-stacked roll-off box from ramping up out of said recesses and away from said one of said first and second ends of the bin.

22. The stackable roll-off bin as claimed in claim 21, wherein said releasable locking means include a locking lever pivotally mounted to at least one side of the bin, said lever being movable between a locking position and an unlocking position, and including means for urging said lever toward said locking position when said lever is moved therefrom toward said unlocking position, and further including means for retaining said lever in both of its locking and unlocking positions, said locking lever being positioned so that when a roller on an above roll-off box ramps downwardly into the recess associated with the locking lever the lever is caused to be pivoted out of said locking position so as to enable said roller to enter the recess, said urging means thereafter causing the lever to return to its locking position.

23. A stackable roll-off box which comprises:
a. a generally rectangular bin having first and second opposing sides, first and second ends, and a bottom;
b. wheels mounted to the bottom of said bin at the four corner regions thereof, said wheels being positioned for enabling the roll-off box to be rolled in a longitudinal direction along a surface;
c. first and second rollers mounted to bottom regions of the bin adjacent to one of said first and second ends, each of said first and second rollers being positioned outboard of an associated one of said wheels, said first and second rollers being mounted directly beneath an associated one of said first and second sides;
d. means defining an upwardly-opening roller-receiving recess in upper regions of each of said first and second sides substantially above the first and second rollers, said recesses being adjacent ramps formed in tops of associated sides of the bin; and
e. a roller stop fixed to the bin at the end of each of said recesses adjacent to said one end of the bin.

24. The stackable roll-off box as claimed in claim 23, wherein said first and second rollers are substantially smaller in diameter than the associated wheels of which they are outboard and wherein the first and second rollers are mounted so that lower regions of thereof are substantially above a surface on which said associated wheels rest, and including a first plate fixed to the first side of the bin outwardly adjacent to the first roller and a second plate fixed to the second side of the bin outwardly adjacent to the second roller, each of said plates extending downwardly below the periphery of its associated roller.

25. The stackable roll-off box as claimed in claim 23, including releasable locking means for blocking rollers of an above-stacked roll-off box from ramping up out of said recesses and away from said one end of the bin, said releasable locking means including a first locking lever pivotally mounted to the first side of the bin and a second locking lever mounted to the second side of the bin, each of said locking levers being movable between a locking position and an unlocking position, and including means for urging each of said levers toward its locking position and further including means for releasably retaining each of the locking levers in both of its locking and unlocking positions, said locking levers being positioned so that when rollers on an above roll-off box ramp downwardly into the recesses the levers are caused to be pivoted out of said locking positions so as to enable the rollers to enter the recesses, said urging means thereafter causing the levers to return to their locking positions.

26. A kit for modifying an existing, non-stackable roll-off box into a stackable roll-off box, said existing roll-off box comprising a generally rectangular bin having first and second opposing sides, first and second ends, and a bottom, and having wheels mounted to the bottom of the bin in corner regions thereof, the wheels being oriented so that the roll-off box can be rolled in a longitudinal direction along a surface, the kit comprising:
a. first and second rollers;
b. means for mounting said rollers to bottom regions of the bin adjacent to one of said first and second ends and outboard of corresponding ones of said wheels and directly under associated sides of the bin;
c. means for forming roller-receiving recesses in upper edges of the first and second bin sides above the mounting points for the rollers, said recess forming means forming a ramp at a predetermined end of the recesses;
d. stops for mounting on the bin at a predetermined end of the recesses; and
e. instructions for modifying the non-stackable bin into a stackable roll-off bin.

27. The modifying kit as claimed in claim 26, wherein the rollers are smaller in diameter than the wheels and wherein said roller mounting means include plates adapted for fastening to sides of the bin so that lower edges of the plates extend substantially below the peripheries of the associated rollers and so that the peripheries of the rollers are higher than the peripheries of the associated wheels.

28. The modifying kit as claimed in claim 26, including locking levers and means for mounting the locking levers to sides of the bin adjacent to said recesses so that regions of the levers extend longitudinally across portions of the recess in a manner keeping a roller from rolling out of the recesses in the direction of the locking levers.

29. The modifying kit as claimed in claim 26, including reinforcing members for attaching to sides of the bin beneath said recesses.

30. A method for modifying an existing, non-stackable roll-off box into a stackable roll-off box, said existing roll-off box comprising a generally rectangular bin having first and second opposing sides, first and second ends, and a bottom, and having wheels mounted to the bottom of the bin in corner regions thereof, the wheels being oriented so that the roll-off box can be rolled in a longitudinal direction along a surface, said method comprising:
 a. mounting first and second rollers to bottom regions of the bin adjacent to one of said first and second ends and outboard of associated ones of said wheels and directly under associated sides of the bin;
 b. forming roller-receiving recesses in upper edges of the first and second bin sides above the mounting points for the rollers, said recesses being formed with a ramp at one end thereof; and
 c. mounting stops on the bin at another end of the recesses.

31. The method as claimed in claim 30, wherein the roller mounting step includes mounting plates to sides of the bin outboard of the rollers so that lower edges of the plates extend substantially below the peripheries of the associated rollers and so that the peripheries of the rollers are higher than the peripheries of the associated wheels.

32. The method as claimed in claim 30, including mounting locking levers to sides of the bin adjacent to said recesses so that regions of the levers extend longitudinally across portions of the recess in a manner keeping a roller from rolling out of the recesses in the direction of the locking levers.

33. The method as claimed in claim 30, including attaching reinforcing members to sides of the bin beneath the recesses.

* * * * *